United States Patent
Suganuma et al.

[19]

[11] Patent Number: 5,872,352
[45] Date of Patent: Feb. 16, 1999

[54] SWINGABLE INDUCTION HEATING CHAMBER FOR MELTING INGOT FOR METAL CASTING

[75] Inventors: Hiromitsu Suganuma; Kazuya Sakamoto; Atsushi Suzuki; Masayoshi Kai; Shinji Kazama; Nobumasa Hamazoe, all of Sayama, Japan

[73] Assignee: Honda Ginken Kogyo Kabushiki Kaisha, Tokyo, Japan

[21] Appl. No.: 620,136

[22] Filed: Mar. 21, 1996

[30] Foreign Application Priority Data

Mar. 22, 1995 [JP] Japan .................................. 7-063197
Mar. 23, 1995 [JP] Japan .................................. 7-063798
Mar. 24, 1995 [JP] Japan .................................. 7-066589

[51] Int. Cl.$^6$ .............................. H05B 6/10; B22D 17/30
[52] U.S. Cl. ......................... 219/646; 219/652; 219/654; 219/674; 219/676; 425/174.8 R; 164/513; 164/DIG. 6; 373/142
[58] Field of Search .................................. 219/646, 654, 219/652, 647, 674, 676; 425/174, 174.8 R, 174.8 E; 164/507, 513, DIG. 6; 373/142, 138, 143

[56] References Cited

U.S. PATENT DOCUMENTS 3,553,414 1/1971 McArthur ................................ 219/656
3,692,969 9/1972 Kasper .................................... 219/676
3,705,285 12/1972 Cachat .................................... 219/646
3,731,040 5/1973 Kasper .................................... 219/676

FOREIGN PATENT DOCUMENTS 5-285625 11/1993 Japan .

*Primary Examiner*—Philip H. Leung
*Attorney, Agent, or Firm*—Merchant, Gould, Smith, Edell, Welter & Schmidt, P.A.

[57] ABSTRACT

A heating machine for heating an ingot of a metal such as a magnesium alloy. The heating machine has a heating chamber equipped with a RF induction coil capable of swinging about a horizontally axis. The coil is placed horizontally, and the metal ingot is fed into the coil from an introduction chamber by a pushrod. Stoppers prevent the ingot from falling from the RF induction coil when it is switched from its horizontal posture to its vertical posture. The coil is wound on a cylindrical member. A rotatable hollow shaft is firmly mounted to the holder in a perpendicular relation to a substantially axially central portion of the cylindrical member. A part of the coil is inserted in the hollow shaft via an insulating material. The rotatable hollow shaft is swung by a swinging mechanism. The induction heating coil is wound on a ceramic holder. A metal ingot is inserted in the holder with a given clearance. A plurality of pillars of L-shaped cross section are fitted over the holder to place it in position vertically and horizontally.

7 Claims, 15 Drawing Sheets

SWINGABLE INDUCTION HEATING CHAMBER FOR MELTING INGOT FOR METAL CASTING

BACKGROUND OF THE INVENTION

1. Field of the Invention:

The present invention relates generally to an injection molding apparatus in which a metal material is heated to be half melt, pulverized and poured into a mold to thereby form a metal casting. More particularly, the invention relates to a heating machine in the injection molding apparatus, for heating an ingot of a metal such as a magnesium (Mg) or aluminum (Al) alloy (hereinafter simply called "ingot"), which includes heating means pivotally movable vertically and horizontally so that an ingot can be fed from sideways with respect to the heating means and heated with the heating means positioned in a vertical position, thus enabling reduction in height and size of the injection molding apparatus and prevention of a shock to be exerted to the heating means and ingot upon feeding of the latter.

2. Description of the Related Art:

The present applicant has previously proposed an injection molding apparatus for metal castings as described in Japanese Patent Laid-Open Publication No. 5-285625. With this proposed molding apparatus, an ingot is continuously changed into a slurry, i.e., a semiliquid material. As a consequence, a high throughput can be obtained. This apparatus is next briefly described having reference to FIG. 15.

In FIG. 15, the aforementioned injection molding apparatus for metal castings is generally indicated by reference numeral 200. The apparatus 200 comprises a screw shaft injector 201 and a material feed chamber 202. The material feed chamber 202 has an ingot introduction chamber 203, a heating chamber 204, a constant-temperature chamber 205 that is a heated material-feeding chamber, and a pulverized material storage chamber 207 which are arranged from top to bottom in this order. The pulverized material storage chamber 207 is equipped with a pulverizing cutter 206. The inside of the material-feeding chamber 202 is maintained as a vacuum or an inert gas ambient. The chambers 203 and 204 are isolated from each other by a shutter 208. The chambers 204 and 205 are isolated from each other by another shutter 209.

In the above-described conventional apparatus, an ingot W is heated in the heating chamber 204. The ingot is then transported into the constant-temperature chamber 205 at appropriate timing. The ingot is pulverized by the pulverizing cutter 206. The material is then injected directly or indirectly into a cavity 213 in a mold 212 via the pulverized material storage chamber 207 with a screw 211. The ingot W is made of a metal such as Mg alloy. When this is heated in the heating chamber 204, the ingot becomes partially molten. The apparatus is characterized in that the material is poured into the cavity when the material is in this partially molten state. Consequently, the conventional apparatus is capable of continuously processing ingots. As a result, the apparatus has the advantage that its productivity is high.

In this injection molding apparatus for metal castings, the material path along which the material is introduced, heated, pulverized, and otherwise processed is located over the injector. The material path continues vertically from the top material introduction portion down to the pulverized material storage chamber disposed under the lowest pulverizing cutter. The ingot is shifted vertically from top to bottom of the vertically extending material path. The material is then pulverized and fed into the injection cylinder.

First, the ingot placed vertically is fed into an induction heating device inside the heating chamber from the top introduction chamber located over the heating chamber. It follows that the material introduction chamber is located over the heating chamber. Hence, the material introduction chamber protrudes greatly vertically over the heating chamber.

Therefore, the conventional molding apparatus has the disadvantage that the height is increased by the height of the material introduction chamber which is placed vertically. Since mechanisms for gripping and introducing the material are mounted over the material introduction chamber, the height is increased further. Hence, the outer dimensions and the height of the molding apparatus are increased. This increases the size of the whole apparatus.

Furthermore, in the conventional apparatus, the ingot is introduced from the top material introduction chamber into the heating means (such as the induction heating device inside the heating chamber) in a vertical relation to the heating means. Therefore, when the ingot is introduced into the heating means vertically, it is difficult to carry out the introduction smoothly and stably without inducing impact. As a result, when the ingot is introduced into the heating means, the heating means and the ingot are impacted. For example, where the induction heating device is employed, it is not desirable to impact the induction heating device, because the heating and holding portions are made of ceramic cylindrical members. Furthermore, it is not desired to impact the ingot, stoppers, and other components when the ingot is introduced.

As described above, in the conventional heating machine, the ingot is held vertically within the heating chamber and heated. Then, the ingot is fed vertically without changing the posture. Therefore, it is necessary to mount the material introduction chamber over the heating chamber. Also, the material introduction mechanism is required to be located over the material introduction chamber. Accordingly, we have taken notice of suppressing the height of the heating machine and setting the direction of introduction of the ingot material in such a way that no impact is induced. Based on these considerations, we have made an invention.

The aforementioned bulkiness of the whole machine, impact due to fall of the ingot, and other drawbacks may be circumvented by designing the heating machine so that it can be swung both vertically and horizontally, introducing a material into the heating machine from a side, and then swinging the heating machine into its vertical position. However, in the prior art RF induction heating device, the heating coil is shaped like a ring, the material to be heated is held in position inside the ring-shaped heating coil with holding elements, and the heating coil is energized. Generally, the heating coil is disposed around the material to be heated or on both sides of the material. Therefore, it is substantially difficult to swing the heating machine. If it is attempted to swing the heating machine, then the mechanism for supporting the heating coil, the swinging mechanism, and other mechanisms are made larger. As a result, the weight of the machine is increased. Moreover, the structure of the machine is complicated.

We have found that the heating machine can be swung by winding an RF induction heating coil around a cylindrical member so as to form a heating machine, introducing a material to be heated into the cylindrical member to form a structure for executing RF heating of the material, and holding the cylindrical member so that it can be swung. Thus, we have made another invention.

When a metal ingot is heated by the prior art techniques, it has been necessary that the temperature variations from location to location in the ingot be reduced to a minimum. For this purpose, it is necessary that the positional relation between the heating coil and the ingot be maintained constant. That is, in order to enhance the efficiency of heating, it is desired to narrow the space between the ingot and the ceramic holder that is a cylindrical member.

However, where the space is reduced to improve the heating efficiency, the ingot may get caught during transportation. The ingot may come into contact with the ceramic holder, thus causing the holder to come off. Some problems may thus arise.

We have found that the aforementioned space is maintained at a small constant value by holding the ceramic holder from above and below by means of supports. In this way, we have made a further invention.

SUMMARY OF THE INVENTION

It is an object of the present invention to provide a metal casting ingot-heating machine which enables miniaturization of an injection molding apparatus by permitting a material to be introduced into a heating chamber from a side of the heating chamber and thus reducing the height of the whole machine. After introduction of the material, the heating means is swung into its vertical position. In this way, when an ingot is introduced, impact due to fall is prevented.

It is another object of the invention to provide a swinging-type induction heating machine which has a simplified, lightweight swinging support mechanism and whose posture can be smoothly and certainly switched.

It is a further object of the invention to provide an induction heating machine which is designed to heat an ingot, firmly holds a ceramic holder so that the positional relation of the ingot relative to the heating coil is maintained fixed, and permits the ingot to be smoothly transported.

In one aspect of the invention, a heating means is able to swing about a horizontal axis such that the heating means can be switched between its horizontal position and its vertical position. An ingot can be fed into a heating chamber while maintaining the ingot in a horizontal posture. Therefore, a material-feeding means can be mounted at a side of the heating chamber. A material can be fed from a side of the heating chamber. This makes it unnecessary to mount a material-feeding chamber and a feeding mechanism over the heating chamber.

The material-feeding means comprises an ingot insertion chamber mounted horizontally outside the heating chamber, an in-feed means for forcing the ingot from the chamber into the heating means, and an openable door for isolating the chamber from the heating chamber.

Fixed stoppers are mounted to prevent the ingot from coming out of the heating means when the heating means is switched from the horizontal posture to the vertical posture. A movable stopper is mounted to hold the ingot when the heating means is in its vertical posture. Thus, the ingot is prevented from falling naturally.

Specifically, introduction of the material into the heating chamber can be carried out when the heating means capable of swinging on the horizontal axis is placed horizontally. After the introduction, the heating means is swung to its vertical position. When the heating chamber is switched to its vertical posture, the ingot is prevented from falling by the fixed stoppers. In the vertical posture, the ingot is held by the movable stopper. After heating of the ingot, the movable stopper is deactivated, and the heated ingot is fed downward.

In a second aspect of the invention, an RF induction heating coil is wound around the outer periphery of a cylindrical member. Thus, an RF induction heating is completed. The cylindrical member is held by a rotating shaft extending at right angles to the axial direction of the cylindrical member. The rotating shaft is made hollow to form a passage inside the shaft. The base portion of the heating coil is inserted in the passage via an insulating material and held there. The rotating shaft is swung by a swinging means to switch the heating machine from its horizontal position to its vertical position. Parts of the insulating material and heating coil are detachably mounted on the rotating shaft. The cylindrical member can be a hollow cylinder or a cylinder having a bottom.

In the second aspect of the invention, the induction coil is wound around the cylindrical member, which is held by the rotating hollow shaft. The cylindrical member can be swung about the rotating shaft. Therefore, a material to be heated is held in the heating machine which can be swung from its vertical position to its horizontal position and vice versa. The cylindrical member which holds the material is held by the rotating shaft and so the heating machine can be swung smoothly, certainly, and easily. Since the rotating shaft is held via bearings on a container in which the heating machine is housed, the heating machine can be swung and held with a simple structure.

A third aspect of the invention lies in an ingot induction heating machine comprising a heat-resistant ceramic holder made of a nonreactive material and upper and lower supports made of a high-intensity ceramic. An induction heating coil is wound around the outer periphery of the ceramic holder. An ingot of an alloy of magnesium or aluminum is accommodated in the holder with a given clearance. The upper and lower supports are fitted over upper and lower portions of the holder to hold it vertically. The supports also act to place the holder in position horizontally. Preferably, the supports are each composed of pillars of L-shaped cross section to reduce the weight. The material directly associated with the ingot of the alloy is fabricated as the heatproof, unreactive ceramic holder to have a longer life. The supports are made of a high-intensity ceramic to secure sufficient intensity.

Other objects and features of the invention will appear in the course of the description thereof, which follows.

DETAILED DESCRIPTION OF THE INVENTION

Figure 15:
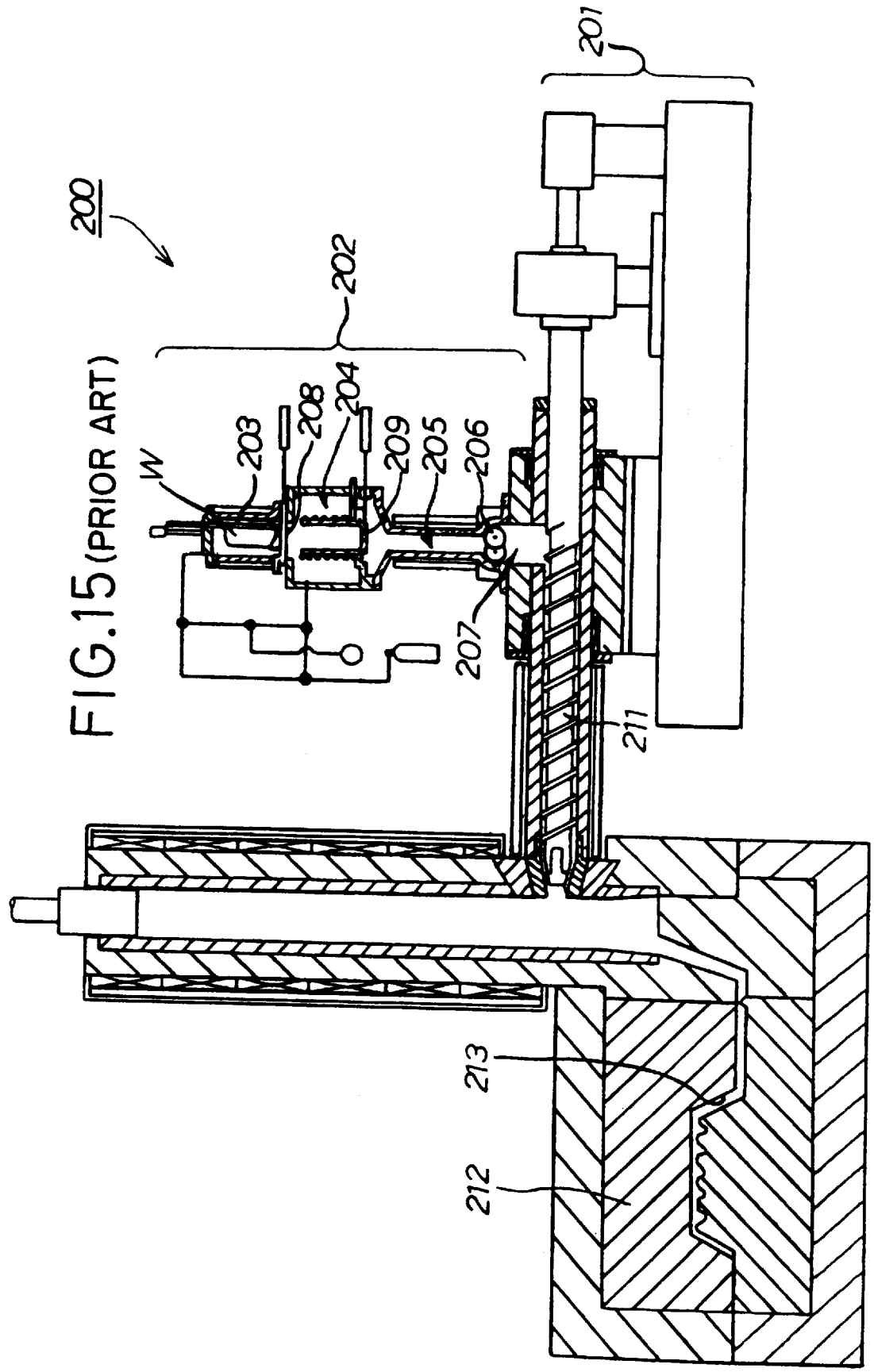
FIG. 15 is a vertical cross-sectional view schematically showing the prior art injection molding machine for metal castings.

The mold and other components used in the present invention are similar to those already described in connection with FIG. 15 and so they will not be described below.

Figure 1:
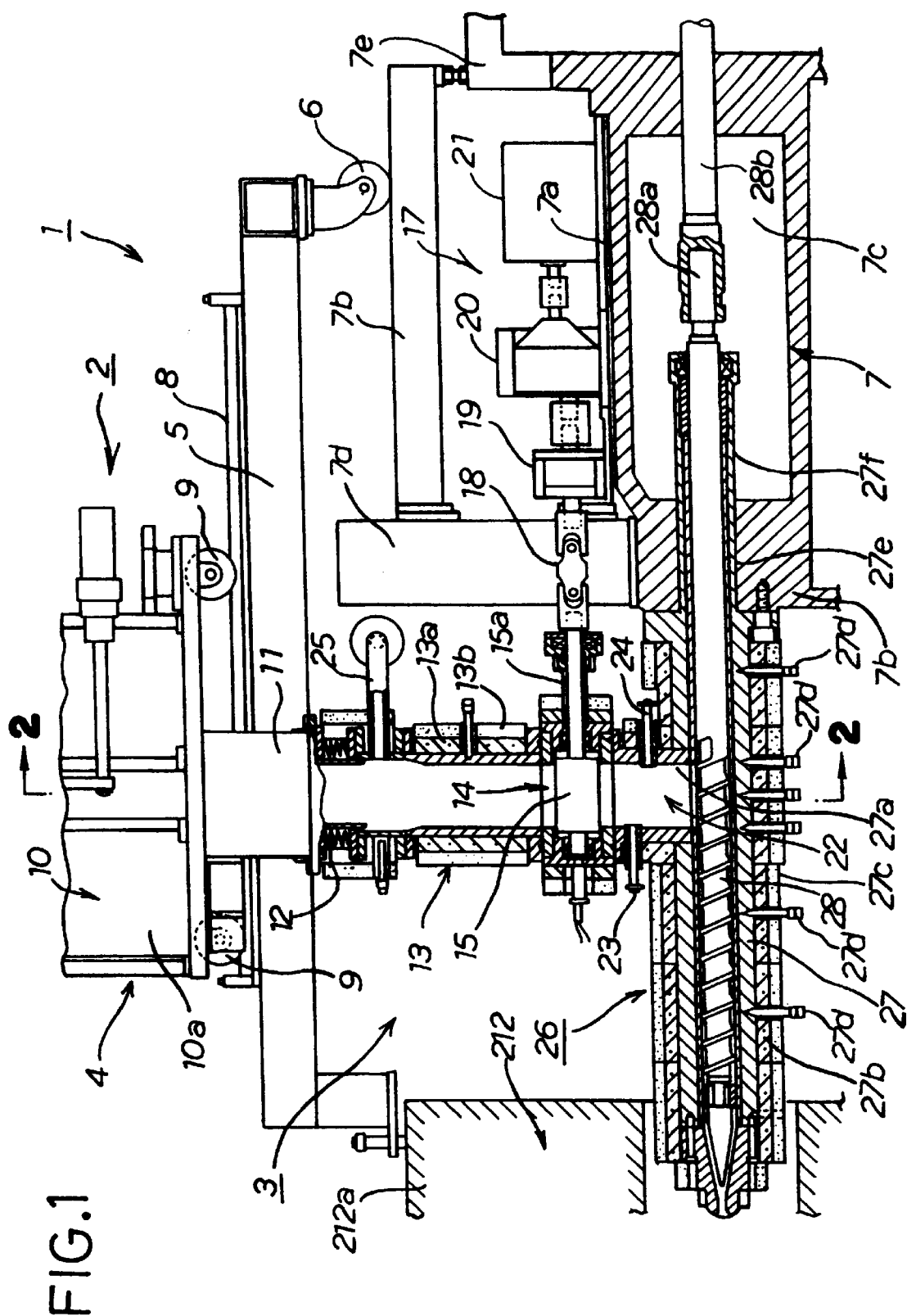
FIG. 1 is a vertical cross section of main portions of the lower half of an injection molding machine for metal castings, the machine being fabricated according to the invention.

Referring to FIG. 1, an injection molding machine for metal castings is generally indicated by reference numeral 1. This machine 1 is composed of an upper half 2 and a lower half 3. The upper half 2 of the machine has a heating chamber 4.

A support frame 5 has a front portion and a rear portion. The front portion of the support frame 5 is held on the platen 212a of a mold 212. The rear portion of the frame 5 is held on a support plate 7b via rotatable wheels 6, the support plate 7b acting to support the lower half 3 of the machine. The support plate 7b is stretched between a post 7d extending upright from the front portion of a support base 7 and a support portion 7e extending upright from the rear portion.

Rails 8 are mounted on the support frame 5. A plurality of wheels 9 are placed on the rails 8 and located on opposite sides of the heating chamber 4, which is held on the support frame 5.

The heating chamber 4 is made of a vacuum vessel 10 which is lined with a magnetic shielding material. The bottom of the vessel 10 has an opening. An ingot exit chamber 11 is located under the opening and in communication with the heating chamber 4.

The lower end of the exit chamber 11 is coupled to the upper end of a heated material-feeding chamber 13 by a sealing joint 12 in the form of metal bellows. The heated material-feeding chamber 13 is located at the top of the lower half 3 of the machine. The joint 12 absorbs upward elongation due to thermal expansion of the material passage in the lower half 3 of the machine.

A pulverization chamber 14 having a pair of pulverizing cutters 15 therein is located under the heated material-feeding chamber 13 and in communication with the chamber 13 which forms a heated material-feeding passage. The cutters 15 are driven by a driver 17 placed on the top surface 7a of the support base 7. The driver 17 comprises a cutter-driving shaft 15a, a swivel 18, a two-shaft gear case 19, a gear reduction mechanism 20, and an electric motor 21. The two-shaft gear case 19 forms an output distributor having one input and two output shafts. The pulverizing cutters 15 are rotated in opposite directions to pulverize the ingot introduced in the heated material-feeding chamber 13.

A pulverized material storage chamber 22 is disposed under the pulverization chamber 14 and in communication with it. Level sensors 23 and 24 for monitoring the level of the stored pulverized material are spaced from each other vertically inside the storage chamber 22.

The heated material-feeding chamber 13, the pulverization chamber 14, and the pulverized material storage chamber 22 are surrounded by both a heater 13a and a heat-insulating material 13b to provide heat insulation of the ingot W (FIG. 2) of Mg alloy or the like supplied from above and to provide heat insulation of the pulverized material. In this way, the heated material-feeding chamber 13, the pulverization chamber 14, and the pulverized material storage chamber 22 form material passages communicating with each other vertically.

Figure 3:
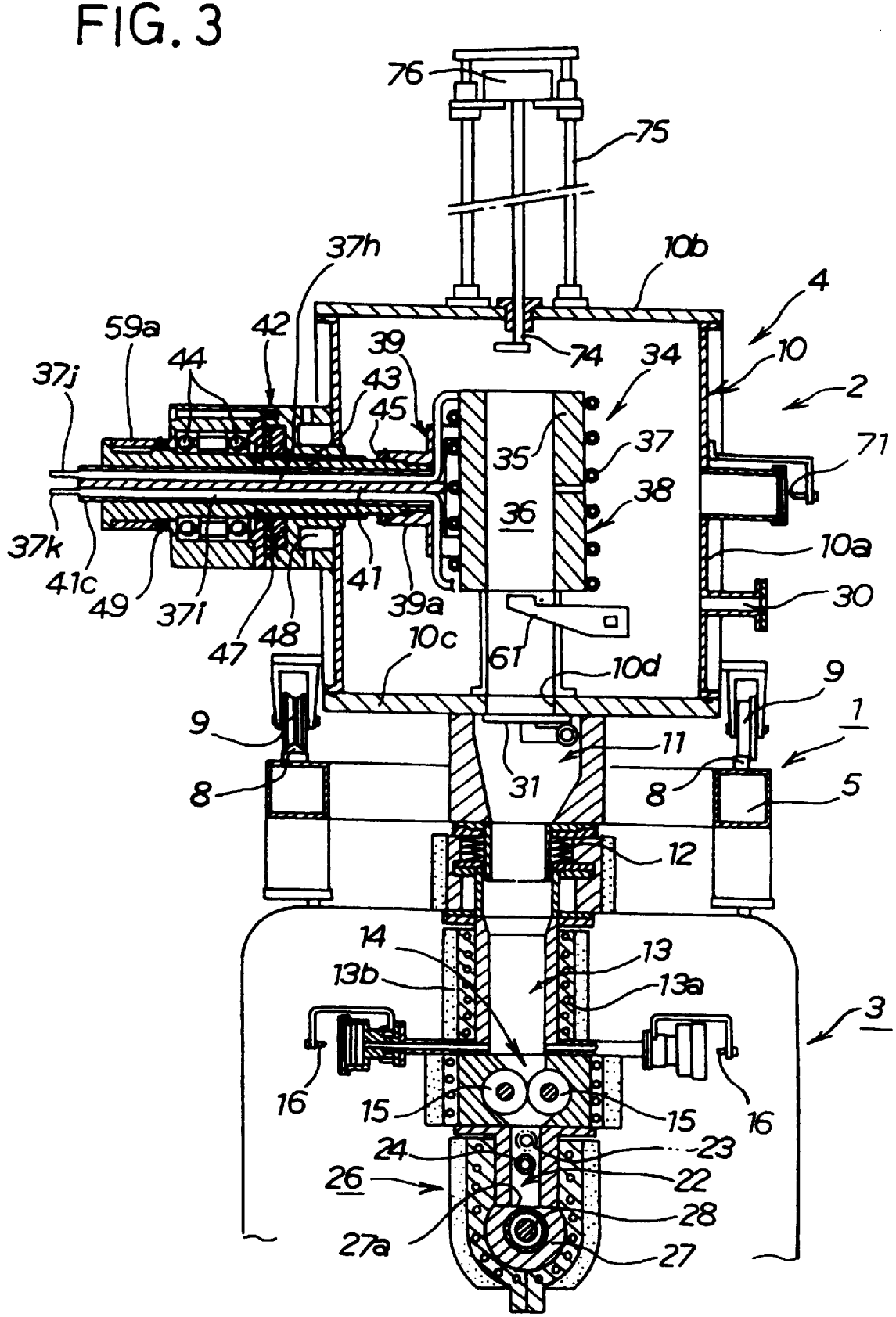
FIG. 3 is a cross-sectional view taken on line 2—2 of FIG. 1.

Pipes 25 are used to evacuate passages extending to the heated material-feeding chamber 13 and various other chambers and to introduce an inert gas into the passages. As shown in FIG. 3, photodetectors 16 consist of light-transmitting-and-receiving devices for monitoring the supply of the ingot into the pulverization chamber 14.

An injector 26 is located under the pulverized material storage chamber 22. The injector 26 comprises a cylinder 27 and a screw shaft 28 mounted inside the cylinder 27. The shaft 28 is provided with spiral grooves in its outer surface. The cylinder 27 is provided with an opening 27a at its top side to receive a cast material. The opening 27a is in communication with the pulverized material storage chamber 22.

The outer surface of the cylinder 27 is coated with a temperature-maintaining heater 27b. The outer surface of the heater 27b is coated with a heat-insulating material 27c. The cylinder 27 has an intermediate-rear portion 27e and a rear portion 27f. The intermediate-rear portion 27e extends through the front portion 7b of the support base 7. The rear portion 27f of the cylinder 27 is so supported as to extend into a cavity 7c in the support base 7.

The screw shaft 28 has a rear end portion 28a which is coupled to an injection hydraulic cylinder unit (not shown) via a rod 28b. Temperature sensors 27d measure the temperature distribution in the axial direction of the cylinder 27, and are mounted on the outer surface of the cylinder 27.

Figure 2:
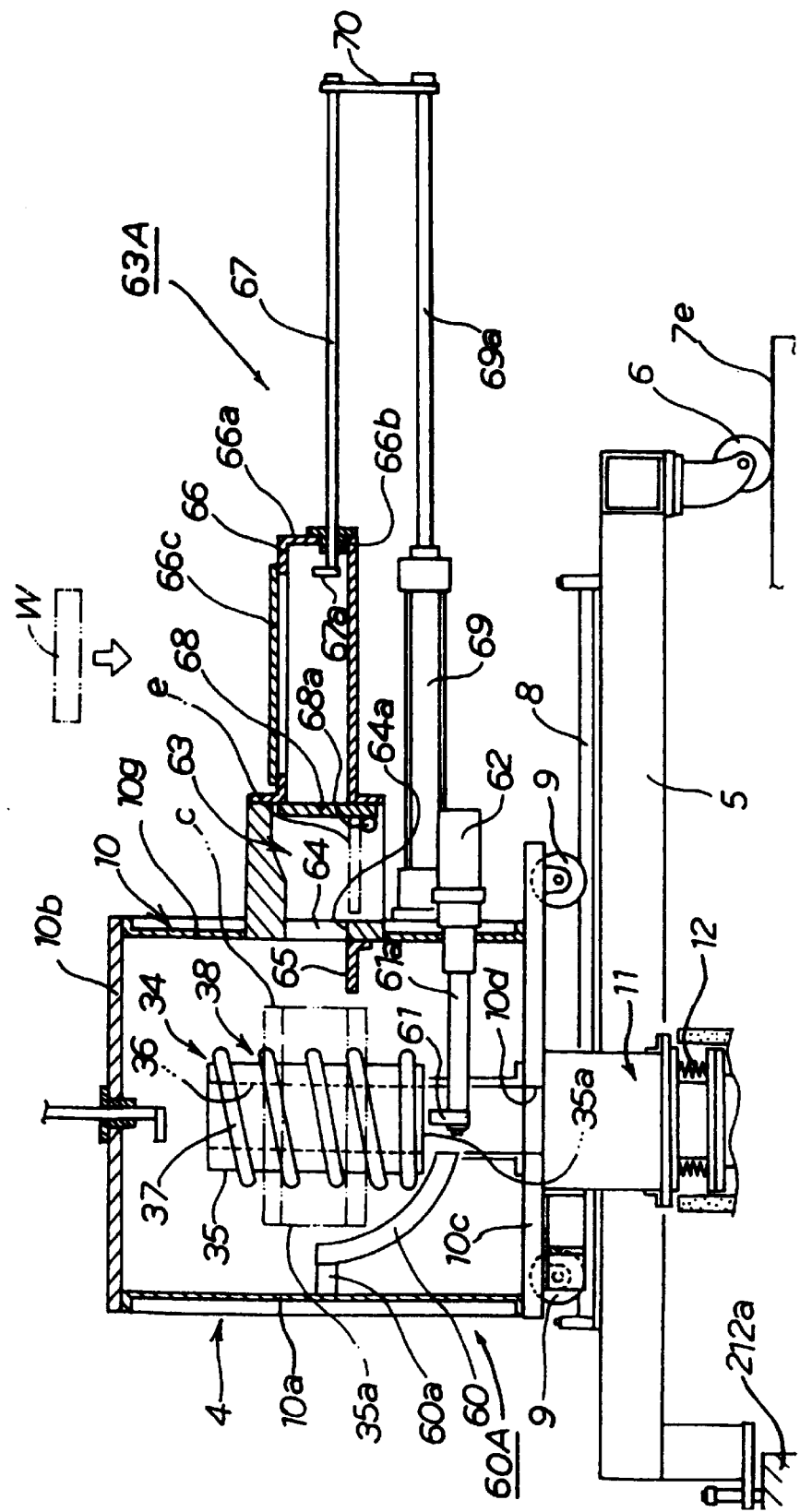
FIG. 2 is a vertical cross section of main portions of the upper half of the aforementioned injection molding machine.
Figure 7:
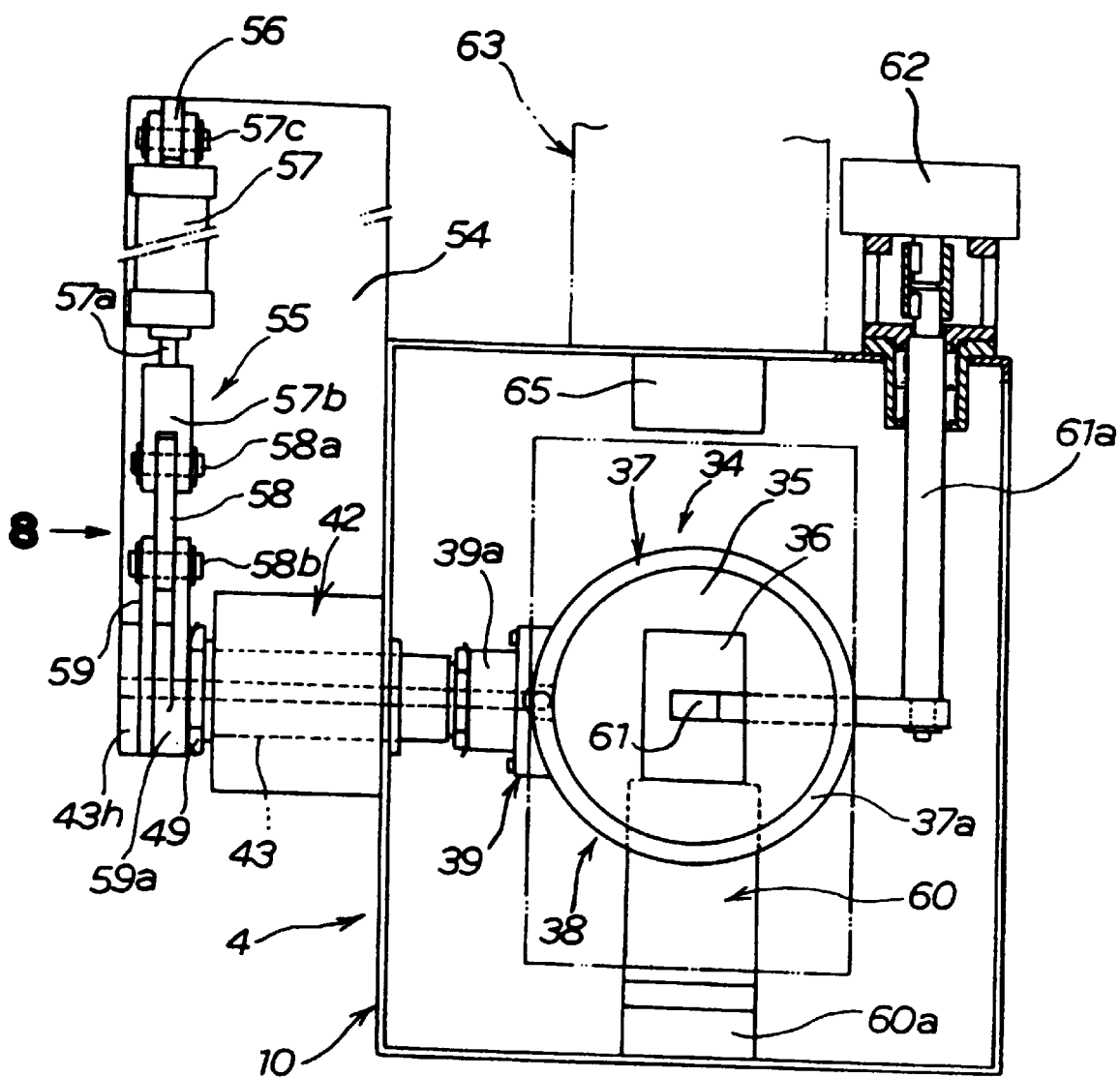
FIG. 7 is a partially cutaway plan view of the heating chamber shown in FIGS. 1–3.

In FIGS. 2 and 3, the heating chamber 4 is composed of the vacuum vessel 10 as mentioned above. This vacuum vessel 10 takes a boxlike form and is rectangular in a plane as shown in FIG. 7. The housing of the vacuum vessel 10 is composed of a side plate 10a, a top plate 10b, and a bottom plate 10c. The vacuum vessel 10 is evacuated via a pipe 30. An inert gas is supplied into the vessel 10 also via the pipe 30.

The bottom plate 10c of the vacuum vessel 10 is provided with an opening 10d which can be opened and closed with a shutter 31. The aforementioned ingot exit chamber 11 is located just under the opening 10d and in communication with this opening. A pushrod 74 is mounted to the top plate 10b of the vacuum vessel 10 to feed the ingot downward. The pushrod 74 is moved up and down by operation of a cylinder unit 76 that is held to a support frame 75 mounted to the top plate 10b.

An induction heating device 34 is mounted inside the vacuum vessel 10 of the heating chamber 4. A ceramic cylindrical member 35 is mounted in the induction heating device 34. The cylindrical member 35 has a pillar-like contour and is centrally provided with a passage 36 which takes a rectangular form as viewed from a plane corresponding to the cross-sectional shape of the ingot. Both ends of the passage 36 are open. In all of figures including FIGS. 2, 3, and 4, the induction heating device 34 assumes a vertical posture.

An RF induction coil 37 acting as a heating means is wound spirally on the outer surface of the cylindrical member 35. The cylindrical member 35 and the induction coil 37 cooperate to form a heating portion 38 of the induction heating device 34.

Figure 4:
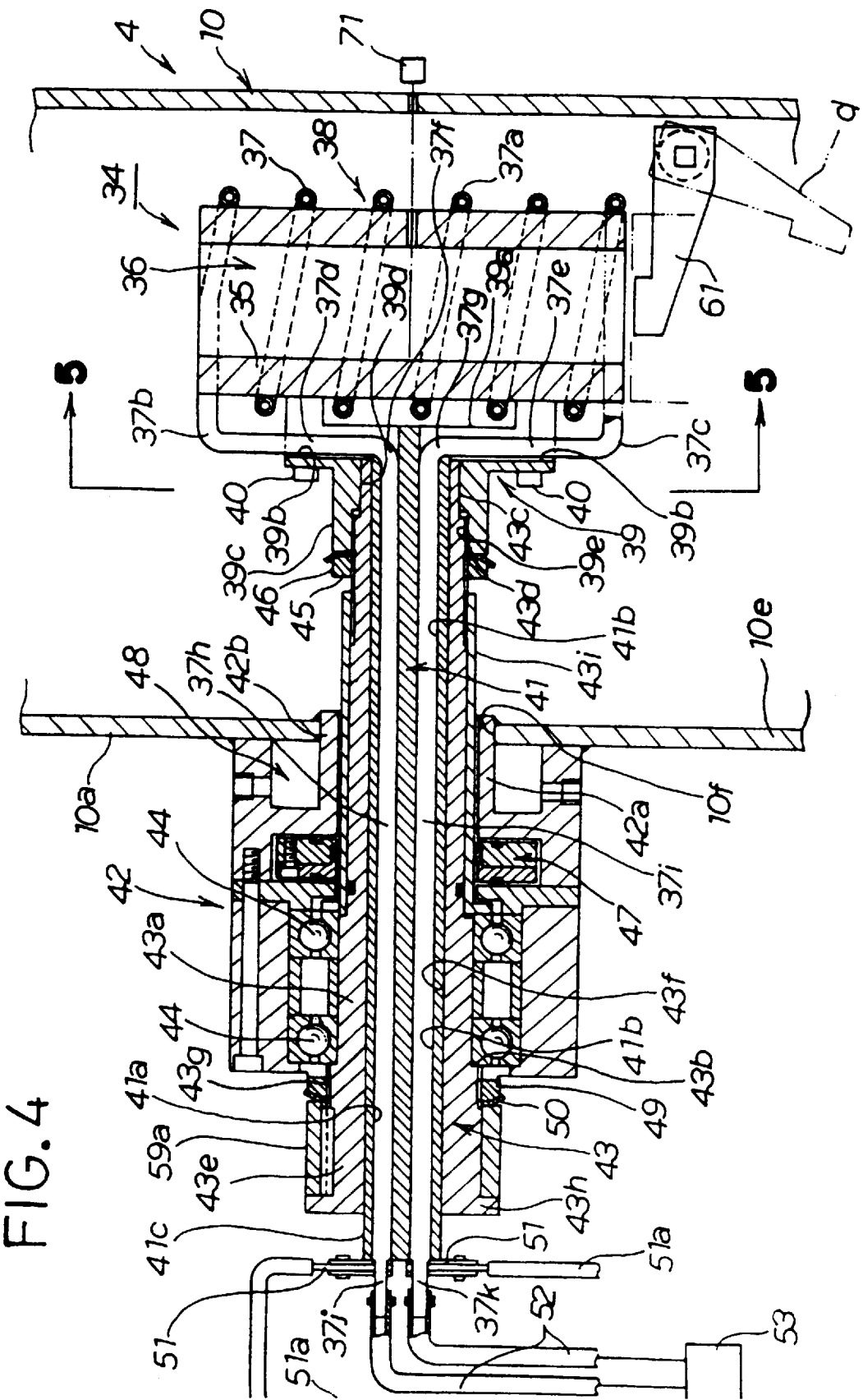
FIG. 4 is an enlarged vertical cross section of main portions of the machine shown in FIG. 3, showing an induction heating machine and a mechanism for holding the heating machine in such a way that it can swing.
Figure 5:
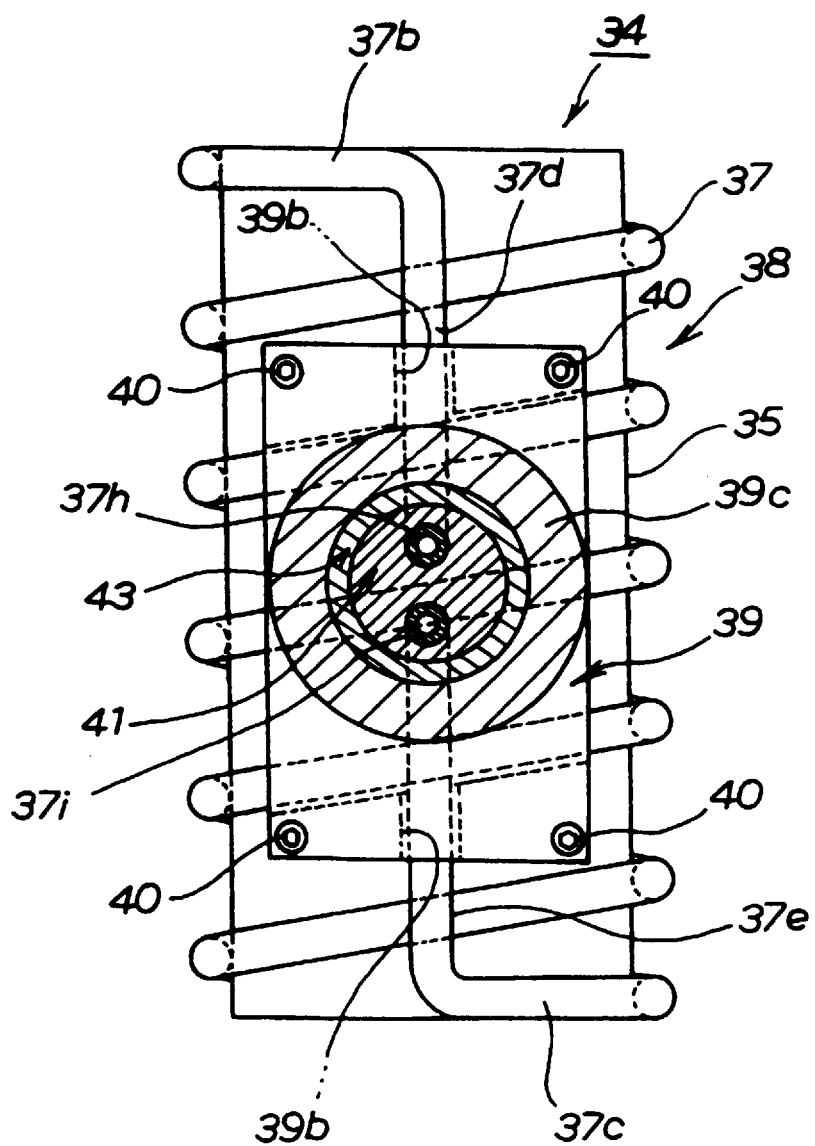
FIG. 5 is a cross-sectional view taken on line 5—5 of FIG. 4.
Figure 6:
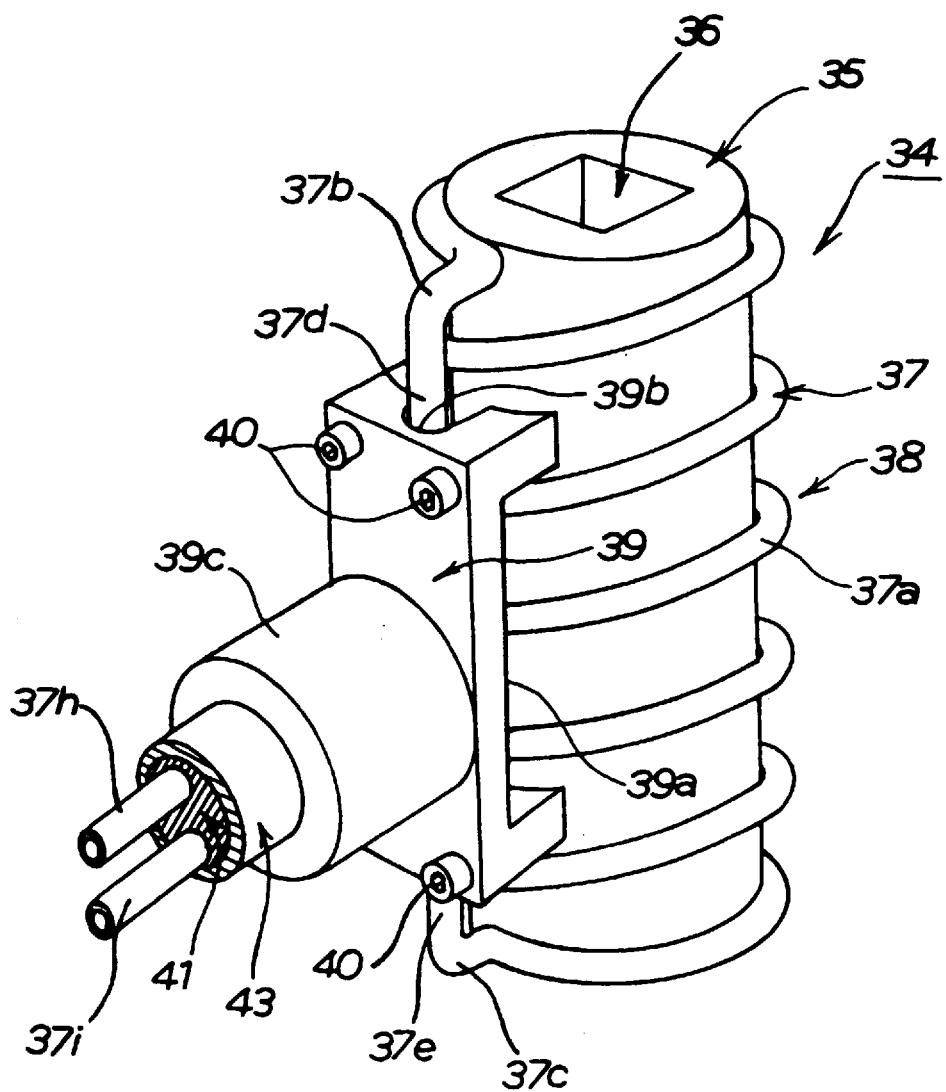
FIG. 6 is a perspective view of main portions of the induction heating machine shown in FIGS. 4 and 5.

Referring to FIGS. 4, 5, and 6, a support stay 39 is firmly mounted to the outer rear surface of the cylindrical member 35 of the induction heating device 34 by a plurality of bolts 40. The stay 39 takes a substantially U-shaped form as viewed from a side and assumes a concave form in a plane. That is, the bolts 40 secure the four corners of the stay 39 to the outer rear surface of the cylindrical member 35, the stay 39 assuming a vertically elongated rectangular form as viewed from the rear side.

The induction coil 37 has a spiral portion 37a which is partially accommodated in a space 39a formed inside the stay 39. The spiral portion 37a of the induction coil 37 has an upper end portion 37b and a lower end portion 37c which are axially bent at right angles on the side of the rear surface of cylindrical member 35 to form symmetrical straight portions 37d and 37e. These straight portions 37d and 37e extend through an upper and a lower recesses 39b, respectively, in the stay 39.

A boss 39c protrudes rearwardly from the center of the stay 39. The axis of the boss 39c is perpendicular to the axial direction of the cylindrical member 35. The boss 39c has a fitting hole 39d near its front end. An internal thread 39e is formed around the rear end of the boss 39c.

An elongated cylinder 41 made of an insulating material extends rearward from the front end of the boss 39c in a coaxial relation to the boss. Axially extending passages 41a and 41b are formed in the cylinder 41 and are spaced from each other vertically. The opposite end portions of the straight portions 37d and 37e of the induction coil 37 are bent at right angles to form bent portions 37f and 37g, respectively. Rearwardly extending portions 37h and 37i extend from the bent portions 37f and 37g, respectively, and are inserted in the passages 41a and 41b, respectively. The base portion of the induction coil is electrically insulated.

An opening 10f is formed in the wall surface 10e of the side wall 10a of the vacuum vessel 10. A bearing member 42 has a bearing portion 42a having a front end portion 42b. This front end portion 42b is fitted in the opening 10f and firmly secured there. A rotatable hollow horizontal shaft 43 is fitted in the bearing portion 42a. The rotatable hollow shaft 43 has a rear half portion 43a held by front and rear bearings 44.

The position of the rear bearings 44 is limited by a step portion 43b formed on the outer surface of the rear half portion 43a of the rotatable hollow shaft 43. The position of the front bearings 44 is restricted by the rear end of a stop collar 43i fitted over the outer surface of the hollow shaft 43. The position of the stop collar on the outer surface of the shaft 43 lies between its front end and an intermediate position.

A fitting portion 43c having a small diameter is formed near the front end of the rotatable hollow shaft 43. An external thread 43d is formed on the outer surface of the fitting portion 43c around its rear end.

The rotatable hollow shaft 43 has a rear portion 43e extending rearwardly of the rear end of the bearing member 42 which extends outwardly of the wall surface 10e of the vacuum vessel 10. A swinging arm 59 forming a swinging means (described later) has a base portion 59a mounted on the outer surface of the rear portion 43e of the hollow shaft 43.

In this way, the rotatable hollow shaft 43 is fitted over the bearing member 42, which is in turn rigidly mounted to the wall surface 10e. The front half portion of the hollow shaft 43 is located inside the vacuum vessel 10, while the rear half portion is located outside the vessel. Thus, the horizontal rotating shaft is formed and rotatably held to the bearing member 42.

The elongated cylinder 41 made of an insulating material is fitted in the hollow portion 43f of the rotatable hollow shaft 43. The fitting portion 43c at the front end of the hollow shaft 43 is fitted in the fitting hole 39d inside the boss 39c which faces the front outer end of the cylinder 41. The external thread 43d engages the internal thread 39e of the boss 39c. At this time, a washer 46 is placed between the external thread 43d of the hollow shaft 43 and the end surface of the boss 39c. This boss 39c is firmly mounted to the hollow shaft 43 by a nut 45. In this manner, the elongated cylinder 41 made of an insulating material and the induction heating portion 38 consisting of the cylindrical member 35 containing the coil 37 are mounted to the hollow shaft 43 so as to rotate with the shaft.

The ingot inside the vacuum vessel 10 is heated after evacuating the inside of the vessel 10 and filling it with an inert gas so that the heating is done in an inert gas ambient. Therefore, it is necessary that the bearing member 42 have hermeticity. Consequently, a sealing mechanism 47 is mounted in the bearing member 42. A cooling water passage 48 is formed in the bearing member 42 near the wall surface 10e to cool the bearing member 42 during the heating.

An external thread 43g is formed around the rear portion 43e of the rotatable hollow shaft 43. The base portion 59a of the swinging arm 59 which is the swinging means as mentioned above is located among a nut 49, a washer 50, and a flange 43h at the rear end of the hollow shaft 43.

The elongated cylinder 41 made of an insulating material has a rear end portion 41c protruding outward from the rear end of the hollow shaft 43, which extends rearwardly of the bearing member 42 as shown in FIG. 4. Feeding terminals 51 are connected to the outer surfaces of rear end portions 37j and 37k, respectively, of the rearwardly extending portions 37h and 37i, respectively, of the coil 37. Flexible feeding cables 51a are used.

The aforementioned coil 37 is made of a hollow pipe. The rear end portions 37j and 37k are connected with cooling water supply-and-deliver hoses 52, respectively. The cooling water hoses 52 are flexible and connected with a cooling water pump 53 on their upstream sides.

Figure 8:
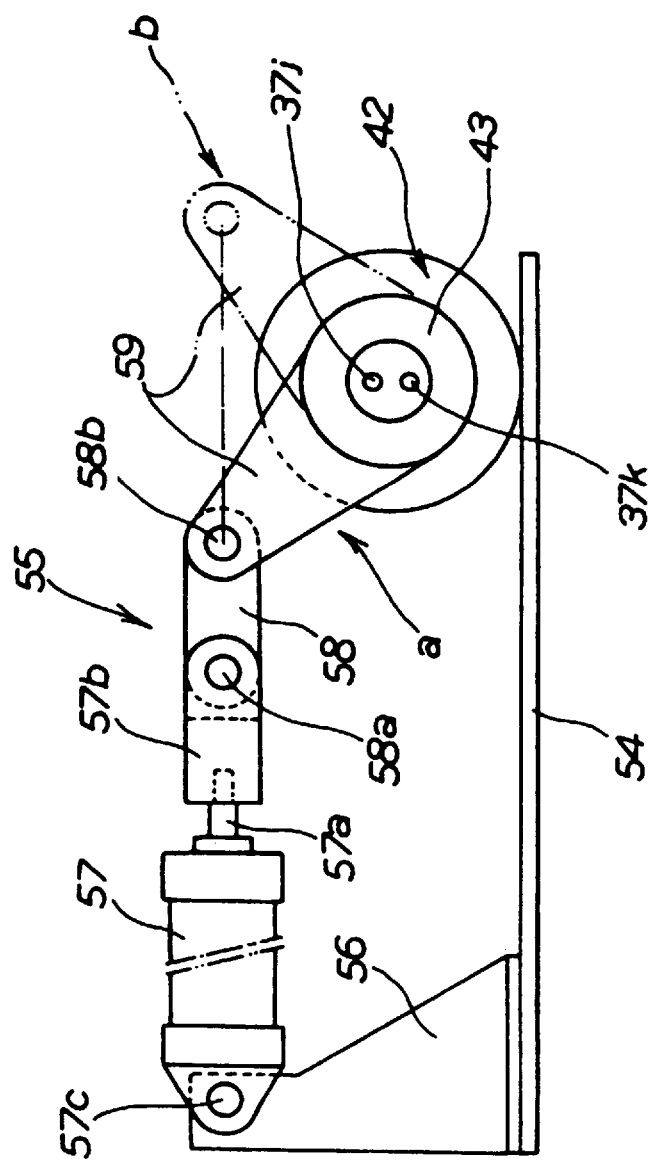
FIG. 8 is an enlarged view taken in the direction indicated by the arrow 8 of FIG. 7, showing a mechanism for swinging a heating means.

As shown in FIGS. 7 and 8, a support plate 54 is mounted to the vacuum vessel 10 on the side of the bearing member 42. The rotatable hollow shaft 43 has a swinging means 55 placed on the support plate 54.

The swinging means 55 comprises a support stay 56 extending upright from the support plate 54, a cylinder unit 57 having a rear end portion, a connecting element 57b, the aforementioned swinging arm 59 whose base portion 59a is connected to the rear end of the hollow shaft 43, and a link plate 58 having pins 58a and 58b. These pins 58a and 58b couple together the swinging arm 59 and the connecting element 57b. The cylinder unit 57 has a pin 57c at its rear end so that the cylinder unit is pivotally mounted to the stay 56. The cylinder unit 57 has a rod 57a to which the connecting element 57b is connected.

In the swinging means 55 described thus far, the cylinder unit 57 is operated to swing the swinging arm 59 via the link plate 58 so that the arm 59 moves from the position a indicated by the solid line in FIG. 8 to the position b indicated by the phantom line. As a result, the rotatable hollow shaft 43 swings. The heating portion 38, or the induction heating device 34, coupled to the hollow shaft 43 is swung from its vertical position to its horizontal position or vice versa.

In FIG. 2 and the ensuing figures, the induction heating device 34 is shown to be in a vertical posture. As indicated by the phantom line c in FIG. 2, the heating device 34 can be swung from its vertical position to its horizontal position.

As shown in FIG. 2, the heating portion 38 of the induction heating device 34 is swung in a counterclockwise direction (i.e., to the left) by the swinging means 55 from the horizontal position indicated by the phantom line c about the hollow shaft. As a consequence, the posture is changed into its vertical posture indicated by the solid line.

Specifically, the ingot W is placed horizontal and inserted into the cylindrical member 35 of the heating portion 38, as described later. The ingot W is inserted in the passage 36 inside the cylindrical member 35 whose opposite ends are open. Under this condition, the heating portion 38 is swung via the cylindrical member 35 as mentioned above. Tilt of the cylindrical member 35 causes the ingot W to fall. A fixed stopper 60 in the form of an arc is formed along the swinging orbit of the lower end 35a of the cylindrical member 35 having the passage 36 in which the ingot W is inserted. Therefore, when the heating portion 38 is moving from the horizontal position indicated by the phantom line c in FIG. 2 to the vertical position, the ingot W is prevented from coming off the cylindrical member 35. The fixed stopper 60 has a stay portion 60a protruding toward the wall surface of the vacuum vessel 10 to hold the top end of the fixed stopper 60 to the vessel.

A movable stopper 61 is mounted below the cylindrical member 35 of the heating portion 38 in the vertical position. The movable stopper 61 is mounted to the front end of a swinging shaft 61a. The swinging shaft 61a extends outwardly of the wall surface opposite to the fixed stopper 60 of the vacuum vessel 10 shown in FIGS. 2 and 7. The swinging shaft 61a is connected to a rotary actuator 62, and is swung downward as indicated by the phantom line d in FIG. 4 by rotating the rotary actuator 62. The fixed stopper 60, the movable stopper 61, and the rotary actuator 62 together form a stopper means 60A in the present example.

When the movable stopper 61 located under the heated ingot stored in the cylindrical member 35 is swung downward, the ingot ceases to be held and falls. As a result, the ingot is fed into the ingot exit chamber 11 and then into the underlying heated material-feeding chamber 13 and the pulverization chamber 14.

Figure 9:
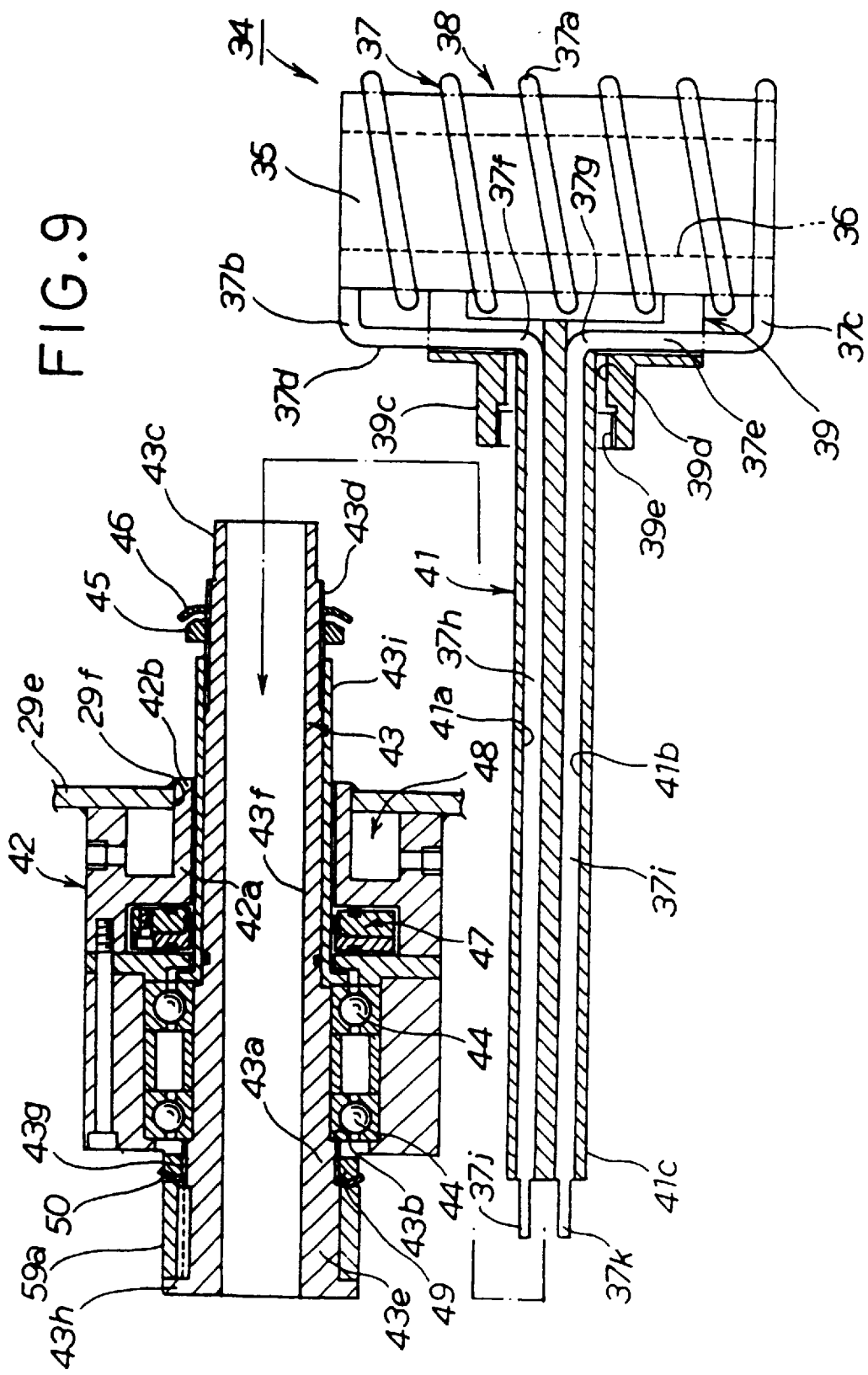
FIG. 9 is an exploded vertical cross section of the heating means shown in FIG. 8 and a mechanism for supporting it.

When the induction heating device 34 should be serviced, the nut 45 shown in FIG. 4 is loosened, and the heating portion 38 is rotated to bring the stay 39 of the cylindrical member 35 out of mating engagement with the rotatable hollow shaft 43. This permits the unit composed of the cylindrical member 35, the stay 39, the coil 37, and the elongated cylinder 41 made of an insulating material to be withdrawn from the hollow shaft 43. When the heating machine should be set up, the cylinder 41 is inserted into the hollow shaft 43 as indicated by the arrow shown in FIG. 9. The internal thread 39e is made to engage with the external thread 43d. The external thread is then tightened with the nut 45. In this way, the induction heating device is mounted. As a result, the heating portion 38 is connected and coupled to the hollow shaft 43 as shown in FIG. 4.

In FIG. 2, an ingot introduction chamber 63 is formed through a wall surface 10g of the vacuum vessel 10 in which the rotary actuator 62 of the movable stopper 61 is mounted. The front end of the ingot introduction chamber 63 opens to the vessel wall surface 10g, thus forming an introduction port 64.

An ingot introduction bridge 65 extends from the lower end 64a of the introduction port 64 into the heating chamber 4. An ingot insertion chamber 66 extends rearwardly of the introduction port 64. A pushrod 67 has a pushing portion 67a at its front end. This pushing portion 67a faces the rear end of the inside of the insertion chamber 66. A rear wall 66a has a cylinder guide 66b to hold the pushrod 67 in such a way that the pushrod 67 can be moved back and forth inside the insertion chamber 66. The ingot introduction chamber 63, the introduction port 64, the introduction bridge 65, and the insertion chamber 66 described thus far together form a material supply means 63A.

A door 68 for hermetically isolating the insertion chamber 66 from the ingot introduction chamber 63 under normal conditions is mounted at the junction between the insertion chamber 66 and the ingot introduction chamber 63. The door 68 has a pin 68a at its lower end. The door 68 can swing in a counterclockwise direction (or, to the left) about the pin 68a as viewed in FIG. 2.

When the ingot is inserted, the door 68 is pushed by the front end of the ingot. The door is opened as indicated by the phantom line in FIG. 2. As a result, the insertion chamber 66 is placed in communication with the introduction chamber 63.

A cylinder unit 69 for insertion of the ingot is mounted under the insertion chamber 66 and the introduction chamber 63. The front end of the rod 69a of the cylinder unit 69 is connected to the rear end of the pushrod 67 by a connecting member 70. The pushrod 67, the cylinder unit 69, and the connecting member 70 together form an in-feed means.

In FIGS. 3 and 4, a radiation thermometer 71 monitors the temperature of the ingot being heated. In FIG. 4, for convenience of illustration, the vacuum vessel 10 is shown in reduced size. The radiation thermometer 71 is schematically shown. The various portions of the novel machine have been described in detail thus far. Supply of the ingot is next described systematically.

FIG. 2 shows the state in which the ingot W has been inserted in the heating chamber 4. The ingot W is inserted into the insertion chamber 66 after opening a cover 66c over the insertion chamber 66.

Then, the cylinder unit 69 is operated in the direction to retract the rod 69a in the state shown in FIG. 2. The pushing portion 67a at the front end of the pushrod 67 pushes the ingot W in the chamber 66 forward. The door 68 is opened as indicated by the phantom line e, and the ingot W is conveyed into the introduction chamber 63.

At this time, the heating portion 38 of the induction heating device 34 is in the horizontal position as indicated by the phantom line c. The ingot W is inserted into the passage 36 in the cylindrical member 35 through the bridge 65. After the ingot has been inserted as described above, the door 68 no longer interferes with the ingot. The door 68 is closed as shown in FIG. 2.

Subsequently, the swinging means 55 rotates the hollow shaft 43 (see FIG. 8) to switch the heating portion 38 from the horizontal posture as indicated by the phantom line c in FIG. 2 to the vertical posture indicated by the solid line. At this time, the fixed stopper 60 and the movable stopper 61 prevent the ingot from coming off the cylindrical member 35.

Under this condition, the ingot is heated for a given time to elevate the temperature. Then, the movable stopper 61 is swung open as indicated by the phantom line d as shown in FIG. 4. The shutter 31 shown in FIG. 3 is opened, followed by supply of the ingot into the ingot exit chamber 11. The ingot is introduced into the heated material-feeding chamber 13 and into the pulverization chamber 14. Thereafter, the ingot is pulverized by the pulverizing cutters 15.

The pulverized ingot is stored in the pulverized material storage chamber 22 and introduced into the injection cylinder 27. The screw shaft 28 is rotated to stir and knead the ingot. As a result, the pulverized ingot is changed into slurry. The slurry is fed into the front portion of the cylinder and stored. After a given amount of slurry is stored, the cast material is injected into a mold 112 by the screw shaft 28.

Figure 10:
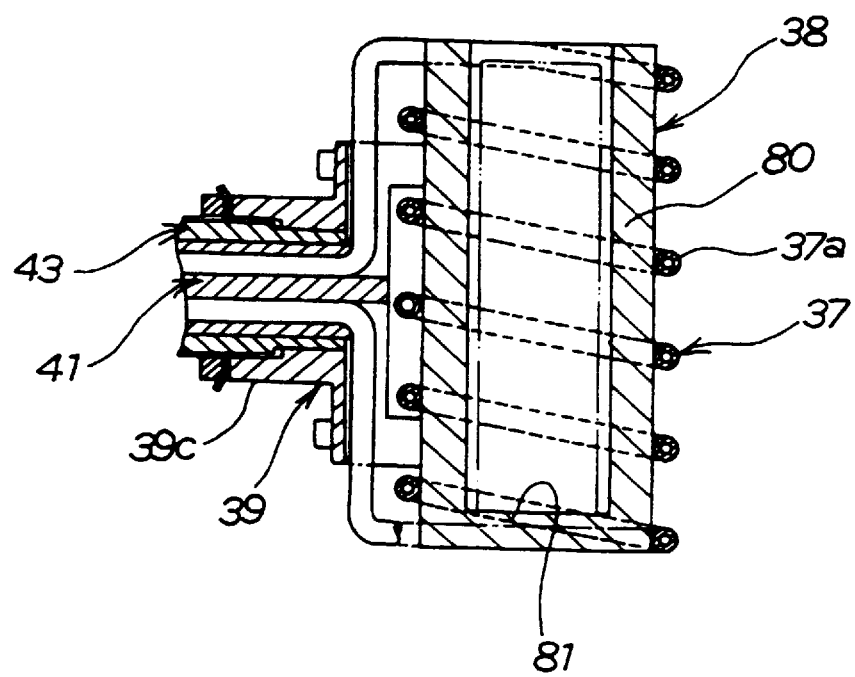
FIG. 10 is a cross-sectional view of a modified heating portion.

FIG. 10 shows a modification of the heating portion of the heating machine. In this example, the cylindrical member is indicated by numeral 80 and has a bottom 81. The coil 37 is wound on the outer surface of the cylindrical member 80 to form the heating portion 38. This modified example is similar to the foregoing example except for the cylindrical member 80 with a bottom 81. That is, the stay 39, the rotatable hollow shaft 43, the elongated cylinder 41 of insulating material, and other components of this modified example are the same as their counterparts of the above example and thus will not be described below.

As described thus far, in the novel machine, the heating means is designed to be swingable about a horizontal axis so as to be switched from its horizontal posture to its vertical posture. Therefore, an ingot can be fed into the heating chamber while maintaining the ingot in its horizontal posture. Consequently, the material-feeding means can be mounted alongside the heating chamber. The ingot can be fed from a side. This makes it unnecessary to mount an ingot-feeding chamber and a feeding mechanism having great heights over the heating chamber, unlike in the prior art techniques. As a consequence, the height of this kind of casting machine including the heating chamber can be greatly reduced. This can lead to a reduction in the size of the casting machine.

When the heating means is switched from its horizontal posture to its vertical posture, the fixed stopper and movable stopper prevent the ingot from coming out of the heating machine. The ingot is certainly held in the heating machine and switched from its horizontal posture to its vertical posture. This assures that the ingot is held.

Unlike the method of consisting of causing the ingot to fall into the heating chamber, the present invention is characterized in that the ingot is fed into the horizontally placed heating portion from a side of the heating chamber. Consequently, the ingot can be inserted and fed without impacting the cylindrical member of the heating machine or the ingot. Hence, it is assured that the heating machine and ingot are prevented from being impacted; in the prior art falling-type ingot supply system, the heating machine and ingot would have tended to be impacted. In this way, the ingot can be fed smoothly and quietly without inducing impact.

In the novel induction heating machine, the rotatable hollow shaft is so mounted firmly that it extends perpendicular to a substantially axially central portion of the cylindrical member. The RF heating coil is wound on the outer surface of the cylindrical member. A part of the coil is inserted in the hollow shaft. The swinging means is provided to swing the hollow shaft. Hence, the cylindrical member including the heating coil is rendered swingable. Therefore, the posture can be switched, for example, by swinging the cylindrical member from its horizontal position to its vertical position about the rotatable hollow shaft.

Furthermore, in the novel induction heating machine, parts of the insulating material and the heating coil are detachably mounted on the rotatable hollow shaft. The cylindrical member and heating coil which wear out relatively quickly can be detached from the hollow shaft and repaired or replaced. The hollow shaft is equipped with complex parts such as bearings and a mechanism for sealing the shaft. It is not necessary to detach these parts. Hence, the repair and replacement are easy to make.

Moreover, in the novel machine, the cylindrical member is a hollow cylinder. This is adapted for continuous processing consisting of entering an ingot from one opening in the cylindrical member and taking out the heated ingot through the other opening. Where the cylindrical member is made to have a bottom, the machine is adapted for batch processing consisting of inserting an ingot from an opening in the cylindrical member and taking out the heated ingot through the same opening.

Figure 11:
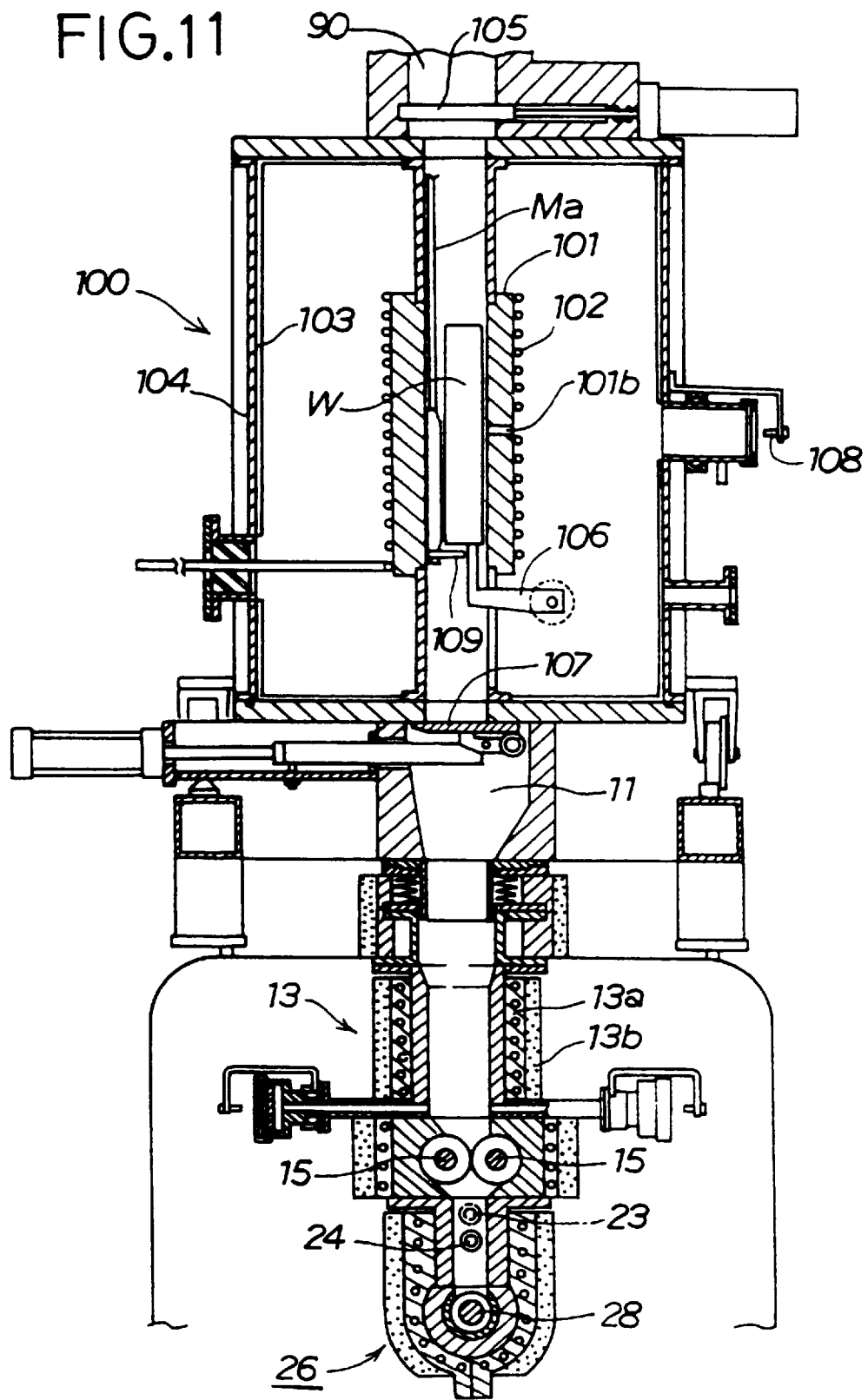
FIG. 11 is a cross-sectional view of main portions of an injection molding machine making use of another structure for supporting an ingot holder.

FIG. 11 shows another example of the heating chamber and corresponds to FIG. 3. In the present example, the heating chamber is generally indicated by reference numeral 100. This heating chamber 100 is a vacuum heating chamber composed of a ceramic cylindrical holder 101, an induction heating coil 102 wound on the outer surface of the holder 101, a magnetic shielding material 103, and an outer sheath 104. An upper shutter 105 for opening and closing an ingot introduction chamber 90 is mounted over the heating chamber 100. An ingot stopper 106 is mounted in the heating chamber 100. A lower shutter 107 is mounted beneath the heating chamber 100.

An ingot W held by an ingot receiver 109 is moved into the ceramic holder 101 by a manipulator Ma. Then, the ingot is placed on the ingot stopper 106 to limit its downward movement.

The ingot W is retained inside the ceramic holder 101. When the ingot is heated to a given temperature, it is monitored from an outside radiation thermometer 108 through a hole 101b formed circumferentially of the ceramic holder 101.

Figure 12:
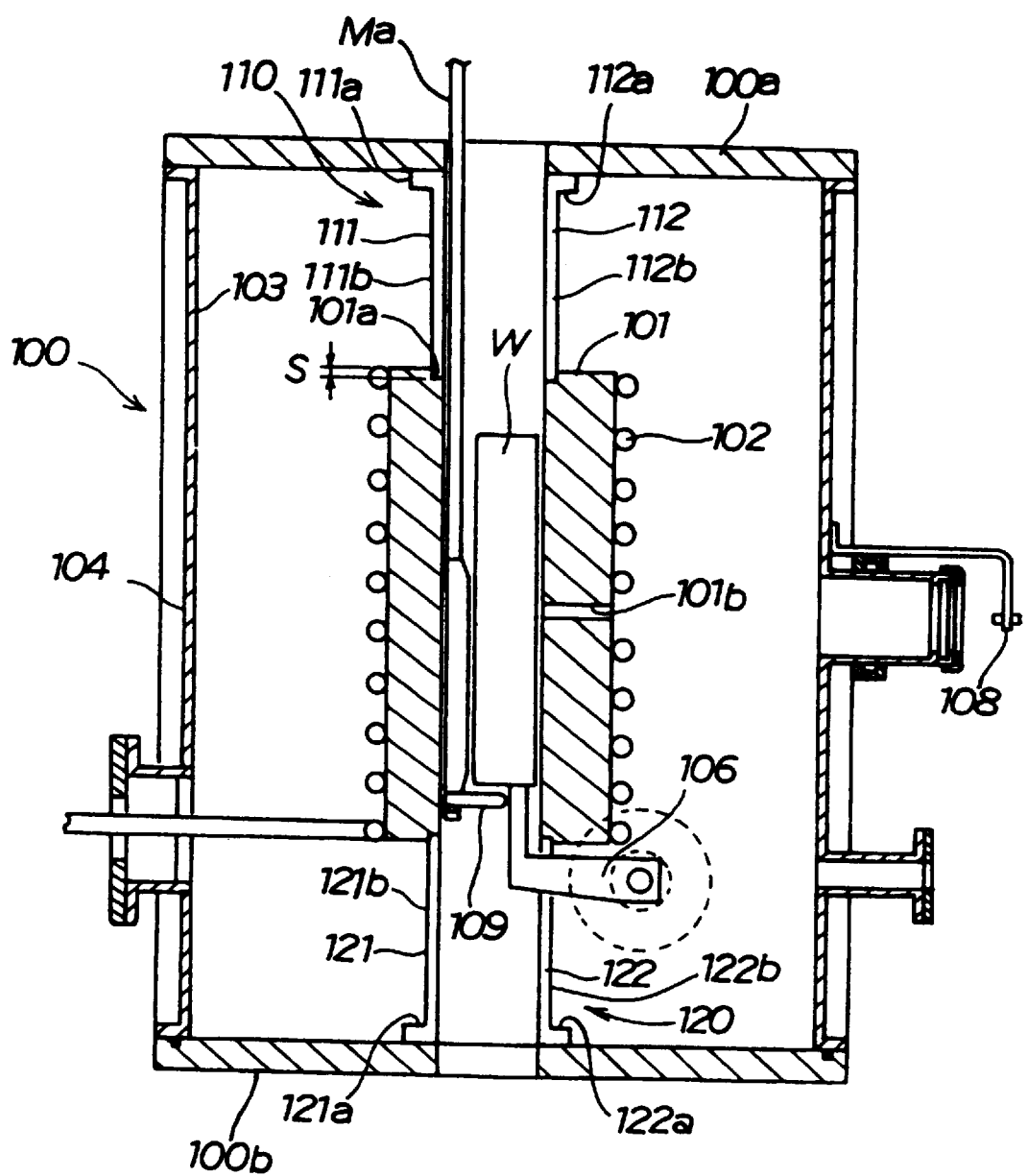
FIG. 12 is an enlarged cross-sectional view of the heating chamber shown in FIG. 11.

Referring next to FIG. 12, the ceramic holder 101 is made of a high-density ceramic including $Al_2O_3$ (aluminum oxide) and SiC (silicon carbide). For example, $SiO_2$ (silicon oxide) content of the ceramic is less than several percent. The induction heating coil 102 is wound around the ceramic holder 101. The holder 101 assures insulation of the heating coil 102 from the ingot W.

Figure 13:
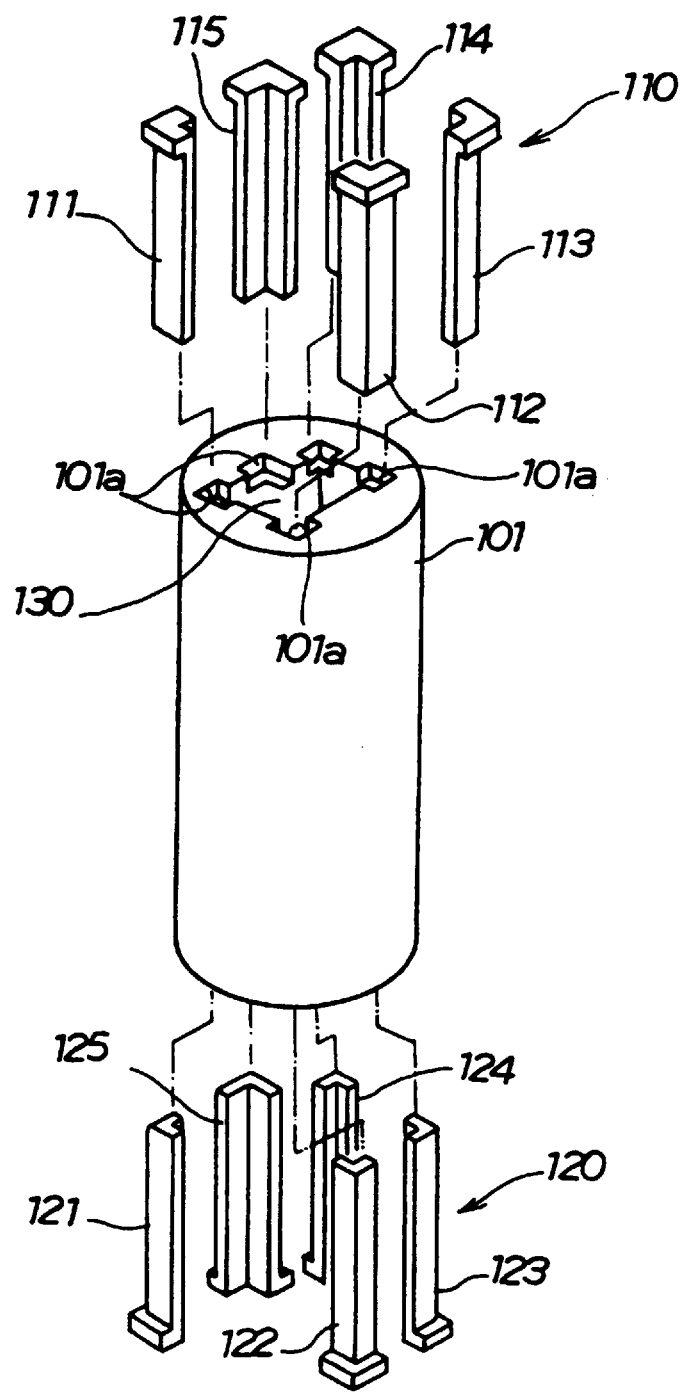
FIG. 13 is an exploded perspective view of the ceramic holder shown in FIGS. 11 and 12 and pillars, illustrating their positional relationship.

The ingot is moved vertically. The top and bottom of the ceramic holder 101 are held by an upper support 110 and a lower support 120, respectively. The upper support 110 is composed of five pillars 111–115, as shown in FIG. 13. The lower support 120 is composed of pillars 121–125. These pillars are similar in shape. The pillars 111, 112, 121, and 122 shown in FIG. 12 are described below.

The pillars 111, 112, 121, and 122 assume an L-shaped form as viewed from a side, and are made of $Si_3N_4$ (silicon nitride). Their shorter sides 111a, 112a, 121a, and 122a are made to abut against an upper cover 100a and a lower cover 100b and firmly bonded to them with an adhesive or screws. Their longer sides 111b, 112b, 121b, and 122b (only the pillar 111 is shown) are so long that they overlap the ceramic holder 101 by a given amount S. The ends are fitted in recesses 101a formed in the ceramic holder 101. Similar relations exist between the ceramic holder 101 and other pillars 113–115, 123–125 (not shown).

Figure 14:
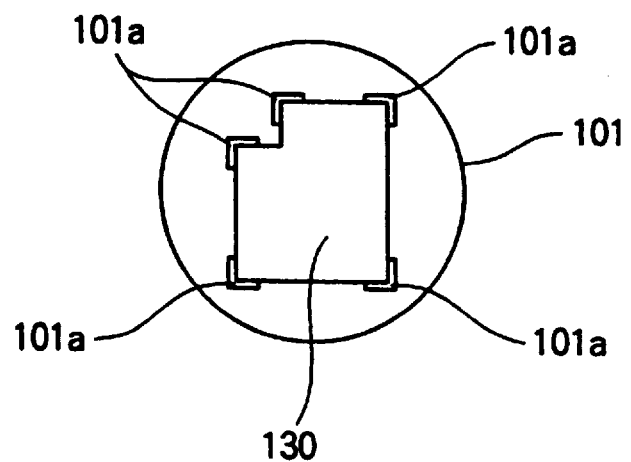
FIG. 14 is a plan view of the ceramic holder shown in FIGS. 11–13.

FIG. 13 is an exploded perspective view illustrating the relation of the ceramic holder 101 to the pillars. Polygonal openings 130 (in this example, they assume an L-shaped modified hexagonal shape) are formed in the top and bottom end surfaces of the cylindrical ceramic holder 101, as shown in FIG. 14. The aforementioned recesses 101*a* are formed adjacent to the right-angled corners of each of these polygons. Each recess 101*a* assumes a substantially L-shaped form similar to the cross-sectional shape of the longer sides of the pillars 111–115, 121–125. The depth of each recess is made equal to the length S by which longer side end portions of the pillars 111–115, 121–125 overlap the ceramic holder 101 in the longitudinal direction.

By constructing the recesses 101*a* in this way, when the pillars 111–115, 121–125 are made to fit over the ceramic holder 101 as mentioned above, the inner side surfaces of the pillars 111–115, 121–125 are substantially flush with the inner side surface of the ceramic holder 101. Therefore, when the ingot W is introduced into the heating chamber 100, the ingot W is moved into the heating chamber 100 while guided by the high-intensity pillars 111–115, 121–125. During this process, the ingot W is prevented from becoming caught.

Also, when the ingot W is being transported into the ceramic holder 101, the ingot W is prevented from coming into contact with the ceramic holder 101. Rather, a given space is maintained between them. Consequently, the inner surface of the ceramic holder 101 is prevented from peeling off; normally such undesirable phenomenon would be caused due to contact with the ingot W. Furthermore, the ingot W is uniformly heated.

Additionally, when the ingot W is being transported downward after heated to a given temperature, the ingot W is prevented from being caught.

Moreover, the heat resistant ceramic holder 101 is firmly supported by the high-intensity supports 110 and 120 which are composed of the pillars 111–115 and 121–125, respectively. Therefore, it is assured that the ceramic holder 101 is placed in position both vertically and horizontally. Hence, a rigid structure is obtained. In addition, the heating efficiency of the heating chamber 100 can be enhanced.

In the present example, the upper support is composed of five pillars. The structure of the upper support is not limited to this example. The upper support may be composed of three, four, six, or more pillars.

As described thus far, the induction heating machine according to the present example comprises the heat-resistant ceramic holder of a nonreactive material and upper and lower supports of a high-intensity ceramic. The induction heating coil is wound on the outer surface of the heat-resistant ceramic holder of a nonreactive material. An ingot of an alloy of magnesium or aluminum is accommodated in the holder with a given clearance. The upper and lower supports are fitted over the upper and lower portions of the holder. The upper and lower supports act to support the holder vertically and place them in position horizontally. Therefore, the ceramic holder can be held firmly. The position of the ingot relative to the heating coil can be maintained fixed. Furthermore, the ingot can be smoothly transported. Consequently, the ingot can be heated efficiently. In addition, the durability of the ceramic holder which would normally be deteriorated by transportation of the ingot can be improved.

Since each of the supports is composed of plural pillars of L-shaped cross section, the body of the heating chamber can hold the ceramic holder with fewer support members than before. The heat capacity associated with the supports is reduced and so the heating efficiency and thermal efficiency are enhanced.

What is claimed is:

1. A heating machine for heating a metal ingot for a metal casting, for use in an injection molding apparatus having a heating chamber for heating an ingot, a pulverization chamber mounted under said heating chamber, and an injector disposed under said pulverization chamber, said injection molding apparatus being designed to heat said metal ingot in said heating chamber, to introduce said heated ingot into the underlying pulverization chamber, to pulverize said heated ingot by said pulverization chamber, to feed said pulverized ingot into said injector and to pour a molded material in the form of a slurry into a mold so as to obtain a metal casting, said heating machine comprising:

a heating means mounted inside said heating chamber and capable of swinging about a horizontal axis;

a material-feeding means mounted at a side of said heating chamber and acting to feed said metal ingot into said heating means from a side when said heating means is placed horizontal; and stopper means for preventing said metal ingot from falling from said heating means when said heating means is swung from its horizontal position to its vertical position.

2. A heating machine according to claim 1, wherein said material-feeding means comprises:

a metal ingot insertion chamber placed horizontally outside said heating chamber;

an in-feed means for feeding said metal ingot from said insertion chamber into said heating means; and an openable door for isolating said insertion chamber from inside of said heating chamber.

3. A heating machine according to claim 1, wherein said stopper means comprise:

a fixed stopper mounted outside an orbit drawn when said heating means is swung from its horizontal position to its vertical position; and a movable stopper located under said heating means when it is in its vertical position.

4. A swinging induction heating machine comprising:

a cylindrical member in which a material to be heated is accommodated;

an RF heating coil wound on said cylindrical member;

feeding means connected with said coil to feed electrical power to said coil, for heating said material in said cylindrical member by RF heating;

a rotatable hollow shaft firmly mounted to said cylindrical member so as to intersect a substantially axially central portion of said cylindrical member in a perpendicular relation to said central portion;

an insulating material via which a part of said heating coil is inserted in said rotatable hollow shaft; and a swinging means for swinging said rotatable hollow shaft.

5. A swinging induction heating machine according to claim 4, wherein a part of said insulating material and a part of said heating coil are detachably mounted to said rotatable hollow shaft.

6. A swinging induction heating machine according to claim 4, wherein said cylindrical member is a hollow sheath.

7. A swinging induction heating machine according to claim 4, wherein said cylindrical member has a bottom.

\* \* \* \* \*